(12) United States Patent
Lin

(10) Patent No.: US 11,937,729 B2
(45) Date of Patent: Mar. 26, 2024

(54) FOOD STEAMERS AND STEAMER BASKETS

(71) Applicant: Dong Lin, Morrisville, NC (US)

(72) Inventor: Dong Lin, Morrisville, NC (US)

( * ) Notice: Subject to any disclaimer, the term of this patent is extended or adjusted under 35 U.S.C. 154(b) by 716 days.

(21) Appl. No.: 16/919,140

(22) Filed: Jul. 2, 2020

(65) Prior Publication Data
US 2022/0000300 A1 Jan. 6, 2022

(51) Int. Cl.
*A47J 27/05* (2006.01)
*A47J 27/00* (2006.01)
*A47J 27/04* (2006.01)
*A47J 36/04* (2006.01)
*A47J 36/20* (2006.01)

(52) U.S. Cl.
CPC .............. *A47J 27/05* (2013.01); *A47J 27/004* (2013.01); *A47J 36/04* (2013.01); *A47J 36/20* (2013.01); *A47J 2027/043* (2013.01); *A47J 2203/00* (2013.01)

(58) Field of Classification Search
CPC ....... A47J 27/04; A47J 27/05; A47J 2027/043
See application file for complete search history.

(56) References Cited

FOREIGN PATENT DOCUMENTS

| AU | 2021105781 A4 | * | 10/2021 | |
| CN | 1510338 A | * | 7/2004 | .............. A47J 27/04 |
| CN | 102512068 A | | 9/2014 | |
| CN | 204232862 U | | 4/2015 | |
| CN | 106993927 A | * | 8/2017 | |
| CN | 207734025 U | | 8/2018 | |
| CN | 109247818 A | * | 1/2019 | .............. A47J 27/04 |
| CZ | 14515 U1 | * | 8/2004 | |
| EP | 1395090 A2 | * | 3/2004 | ........... H05B 6/6479 |
| KR | 19990002353 U | * | 1/1999 | .............. A47J 27/04 |
| KR | 0416339 Y1 | * | 5/2006 | |
| KR | 0446916 Y1 | * | 12/2009 | |
| KR | 2014018709 A | * | 2/2014 | |
| KR | 2039707 B1 | * | 12/2019 | .............. A47J 27/04 |
| WO | WO-2012047022 A2 | * | 4/2012 | .............. A47J 27/05 |

OTHER PUBLICATIONS

Nostalgia, "HDS248COKE Large Coca-Cola Diner-Style Steamer," available at: https://www.amazon.com/Nostalgia-HDS248COKE-Coca-Cola-Hot-Steamer/dp/B01J5A4MU4; downloaded from the internet Mar. 12, 2020.

* cited by examiner

*Primary Examiner* — John J Norton
(74) *Attorney, Agent, or Firm* — Rimon PC

(57) ABSTRACT

The present application discloses a new steamer and steamer baskets that can be used with the new steamer. The new design provides a water-level window for observing the water level in the bottom tray of the steamer and an aperture for adding water to the bottom tray when the water level is low. Unlike a traditional multi-tier steamer in which food trays must be removed in sequence from top to bottom, the new design disclosed herein allows each streamer basket to be individually removed and placed.

8 Claims, 10 Drawing Sheets

FOOD STEAMERS AND STEAMER BASKETS

FIELD OF THE TECHNOLOGY

The present disclosure relates generally to cooking appliances, and more specifically, to food steamers and steamer baskets.

BACKGROUND

Food steamers can be used to cook vegetables, meat, fish, and poultry, and to heat up leftovers. Steaming reduces the use of cooking oil and is a healthier way of preparing food compared to frying. Traditionally, a steamer includes a bottom tray for holding water. When heated, the water in the bottom tray boils and sends hot steam upwards to heat up the food placed above the bottom tray. A traditional steamer often includes multiple food trays that can be placed on top of the bottom tray in a multi-tiered structure. A food tray is usually perforated at the bottom to allow hot steam to rise through and heat up the food placed inside the food tray.

When using a traditional steamer to cook food, a potential hazard is the water drying up in the bottom tray when no one is paying close attention. This is dangerous and will lead to fire if the steamer is left unattended. Because the water level in the bottom tray is not observable, even if a person is overseeing the steaming process, the water could still dry up without being noticed, causing overheating.

When the water in the bottom tray is dangerously low, more water must be added to the bottom tray. In a traditional steamer, to add water, food trays stacked on top of the bottom tray are removed first to expose the bottom tray. After the water level is restored, the food trays can then be placed back on top of the bottom tray. It is a cumbersome process to replenish water in a traditional steamer.

The multi-tiered structure of a traditional steamer allows more food items to be cooked simultaneously. In a multi-tiered steamer, there is a top food tray and one or more middle trays, all arranged in a stack. During cooking, to reach and observe the food in a middle tray, the food trays above this middle tray must be removed and placed aside so that the food in the middle tray is exposed, disrupting the cooking process in other trays.

To overcome the above problems identified in traditional steamers, the present application discloses a new steamer and steamer baskets that can be used in associated with the new steamer.

SUMMARY

Accordingly, it is an objective of the present application to disclose a new steamer designed for food preparation. The new steamer comprises a bottom section, a top section, and a lid. The top section comprises one or more containers. The bottom section is for holding water. The top section is placed over the bottom section. In one embodiment, the one or more containers are stacked over the bottom section. The one or more containers can slide in and out of the top section individually. The lid covers the top section and comprises an aperture located near an edge of the lid. In one embodiment, the aperture leads to a water chute down to the bottom section. In another embodiment, the aperture leads to a gap between the walls of the top section and the containers. In some embodiments, the center portion of the lid is removable. When the center portion of the lid is removed, one or more steamer baskets can be placed in the center of the lid.

In some embodiments, a plurality of lids are available, each configured with a different center portion. The lids are exchangeable. In one embodiment, the center portion of the lid is circular. When the circular center portion is removed, conventional steamer baskets, such as bamboo steamer baskets, can be placed on the lid for cooking. In another embodiment, the center portion of the lid is rectangular and is designed to hold perforated metal steamer baskets.

In some embodiments, the bottom section comprises a window for viewing the water lever inside the bottom section. In some embodiments, the bottom section may further comprise a heating element.

In some embodiments, one of the one or more containers is perforated and resembles traditional steamer baskets. In some embodiments, one or more containers comprise a solid bottom sheet.

The present application also discloses a rectangular-shaped steamer that comprises a lid with a removable center and one or more containers that are designed to slide in and out of the steamer when they are pulled by handle. The rectangular-shaped steamer may further comprise a bottom section designed to hold water. In some embodiments, the steamer is designed to sit on a stove for heating through the bottom section. In other embodiments, the steamer comprises a heating element. The heating element may be an electric heating element or a gas heating element.

In some embodiments, the lid of the rectangular-shaped steamer is designed to hold one or more steamer baskets when the center is removed. The lid may comprise an aperture designed to lead water to the bottom section. The aperture may be located off center, for example, close to an edge of the lid.

In some embodiments, the bottom section comprises a window for viewing the water level in the bottom section.

BRIEF DESCRIPTION OF THE DRAWINGS

These and other features of the present disclosure will become readily apparent upon further review of the following specification and drawings. In the drawings, like reference numerals designate corresponding parts throughout the views. Moreover, components in the drawings are not necessarily drawn to scale, the emphasis instead being placed upon clearly illustrating the principles of the present disclosure.

DETAILED DESCRIPTION

Embodiments of the disclosure are described more fully hereinafter with reference to the accompanying drawings, in which embodiments of the disclosure are shown. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art.

Figure 1:
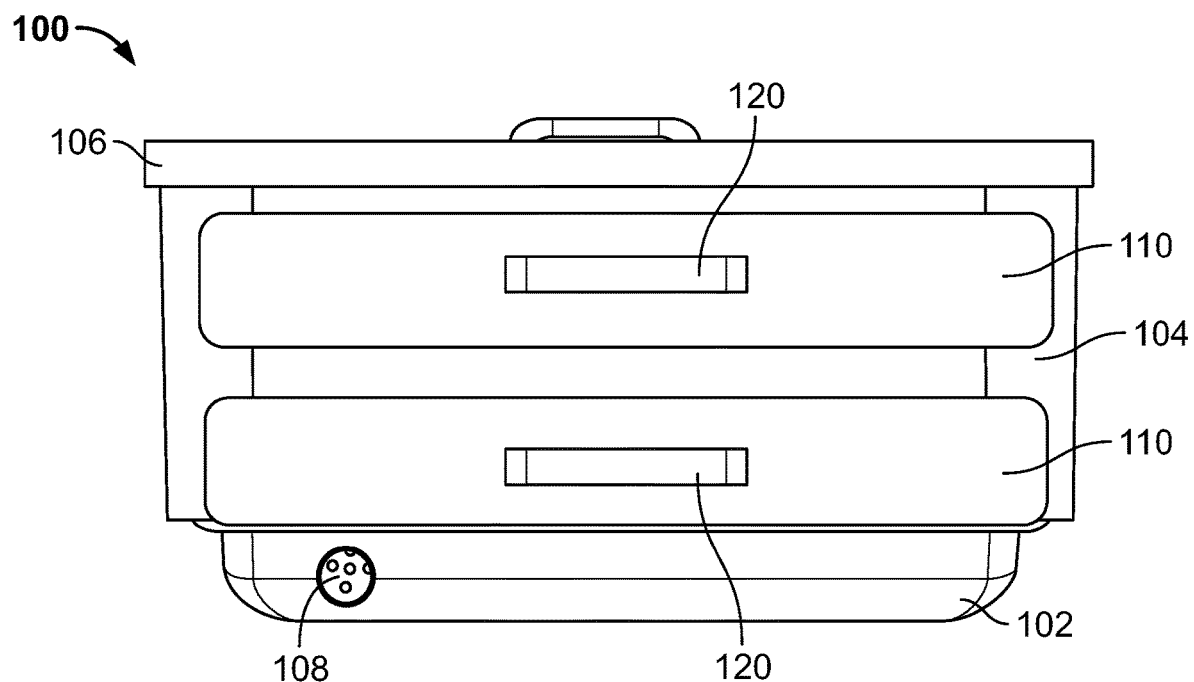
FIG. 1 illustrates one embodiment of the new steamer disclosed herein.

In referring to FIG. 1, a steamer 100 is shown. The steamer 100 includes a bottom section 102, a top section 104, and a lid 106. The bottom section 102 is designed to hold water and includes a water-level viewing window 108. The top section 104 is above the bottom section 102. The top section 104 includes two containers 110 and is on top of the bottom section 102. The lid 106 covers the top section 104. The lid 106 includes an aperture (not shown in FIG. 1) located near an edge of the lid 106. For example, the aperture may be preferably located near the far side of the lid 106, i.e., the far-left corner or the far-right corner of the lid 106.

The bottom section 102 may include a heating element in some embodiments. For example, the heating element may be electric. The bottom section 102 may be designed for a cook top, a stove, or a grill.

The steamer 100 in FIG. 1 is of a rectangular shape. The top section 104 in FIG. 1 is shown to include two containers 110. In other embodiments, the top section 104 can be configured to include one container 110 or more than two containers 110. Each container 110 can slide in and out of the top section 104 when pulled by the handler 120.

Figure 2:
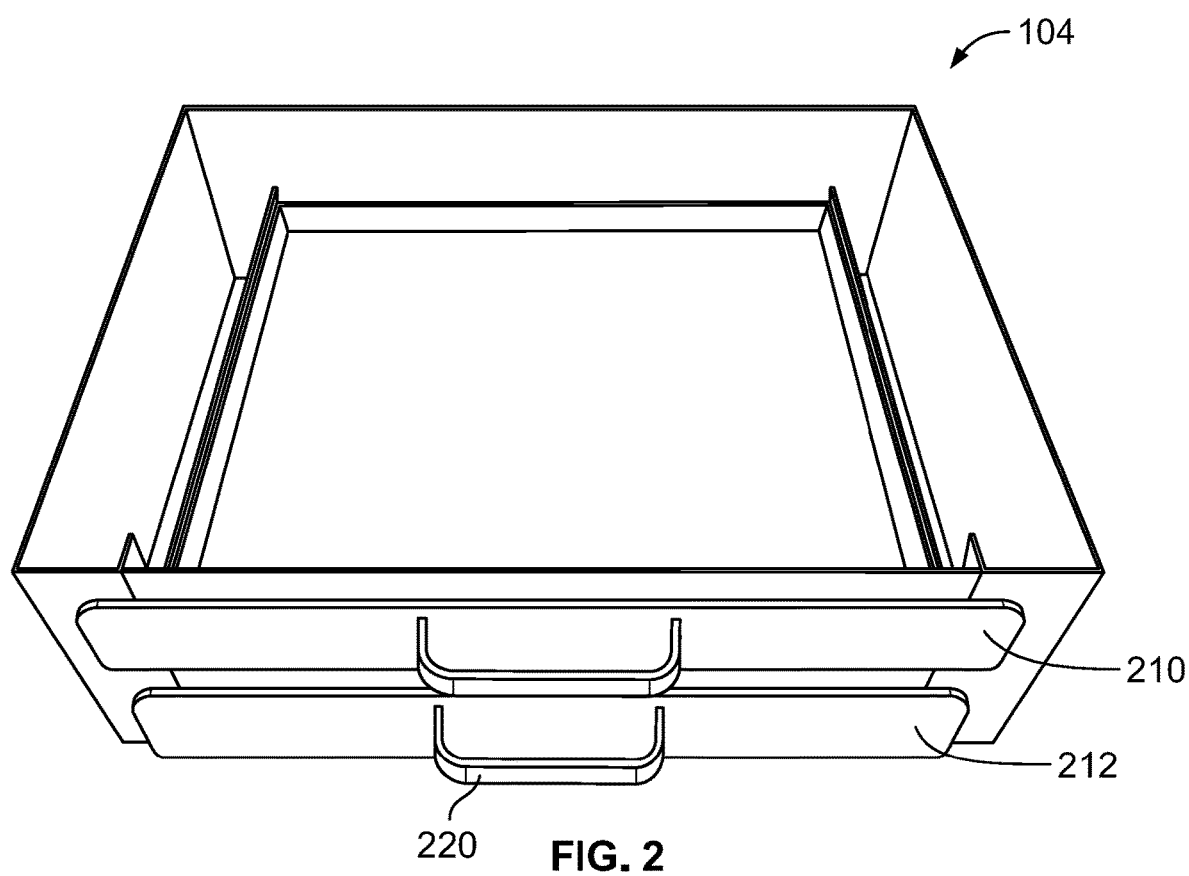
FIG. 2 is an illustration of a steamer basket to be used with the steamer disclosed herein.

FIG. 2 illustrates the top section 104 without the bottom section 102 and without the lid 106. The top section 104 includes two containers 210 and 212. Each container, 210 and 212, has a handler 220 for pulling by hand. The top container 210 has a solid bottom. Liquid food, such as soup, can be placed directly inside the container 210. In some embodiments, a container, 210 or 212, is perforated, resembling a traditional steamer basket.

Figure 3A:
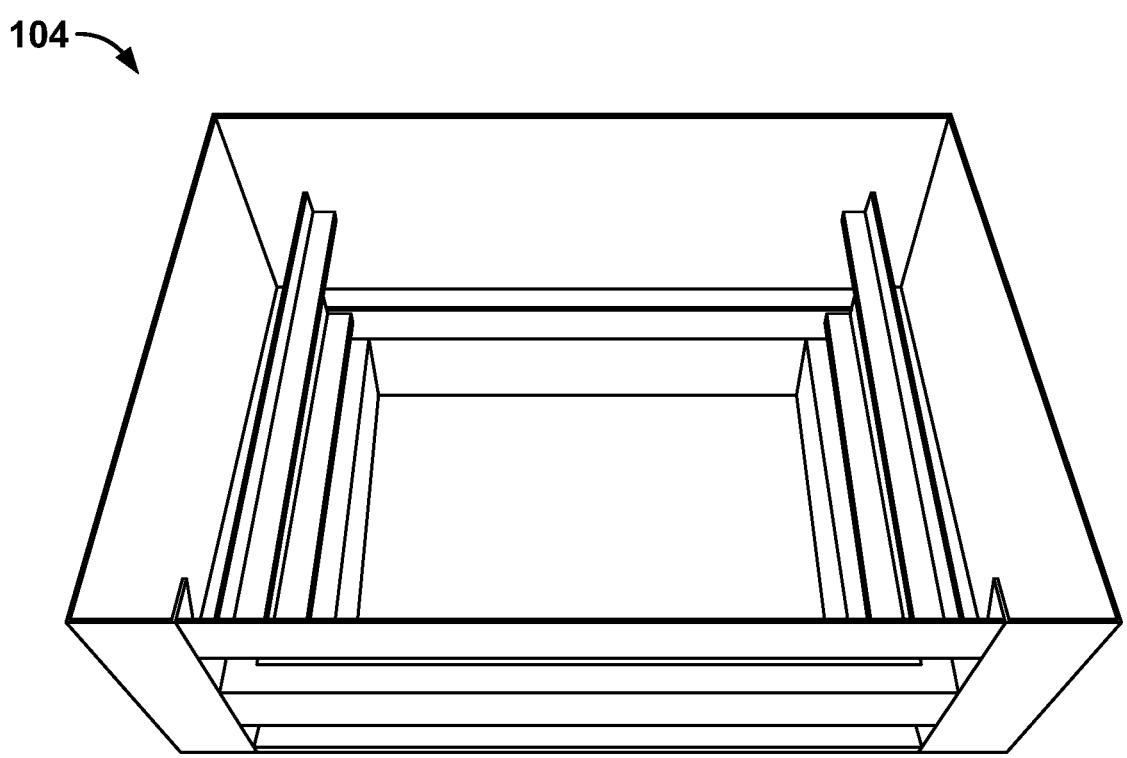
FIGS. 3A-3C illustrate three exemplary top sections with the containers taken out.
Figure 3B:
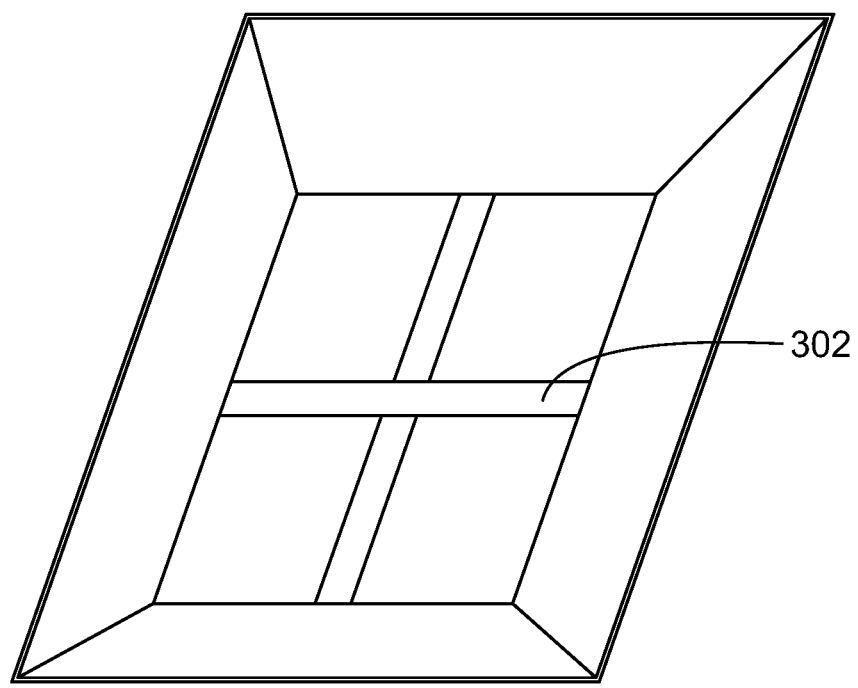
Figure 3C:
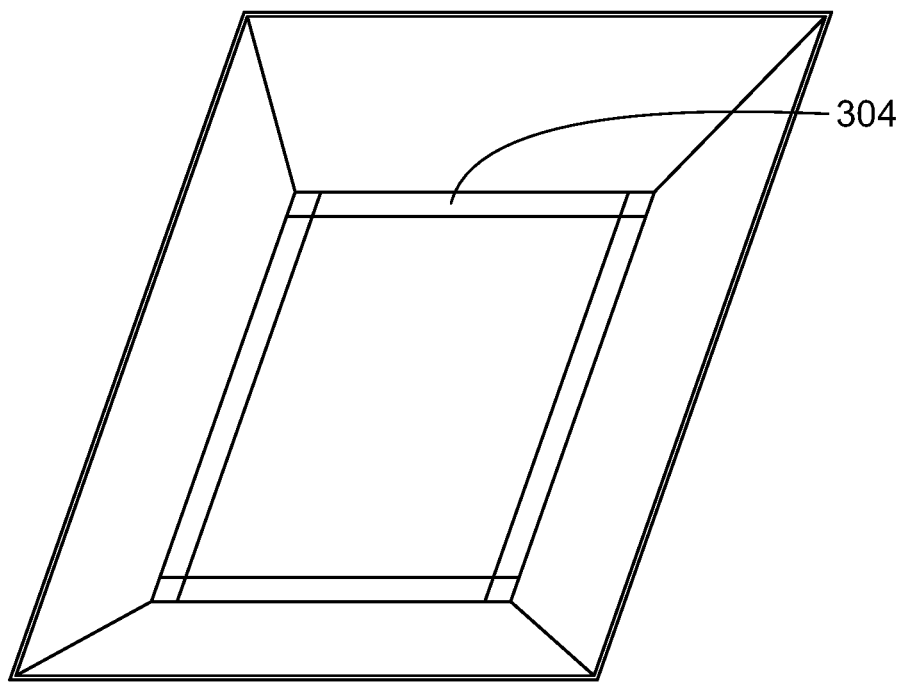

Different from a traditional steamer basket, either container 210 and 212 can slide in and out of the top section without disturbing the other container, allowing easy inspection of food inside individual containers. FIG. 3A illustrates an exemplary top section 104 without the containers 210 and 212. The containers 210 and 212 have been taken out. In FIG. 3A, the bottom of the top section 104 is solid and covered by a metal sheet. In other embodiments, the bottom can be made of a frame 302 as shown in FIG. 3B. Alternatively, the bottom can be largely empty as shown in FIG. 3C. In FIG. 3C, the edge 304 of the bottom sheet extends inward, to provide support to the containers, 210 and 212. In some embodiments, the top section 104 and the bottom section 102 are integrated into one piece. In other embodiments, the top section 104 and the bottom section 102 are separable.

Figure 4:
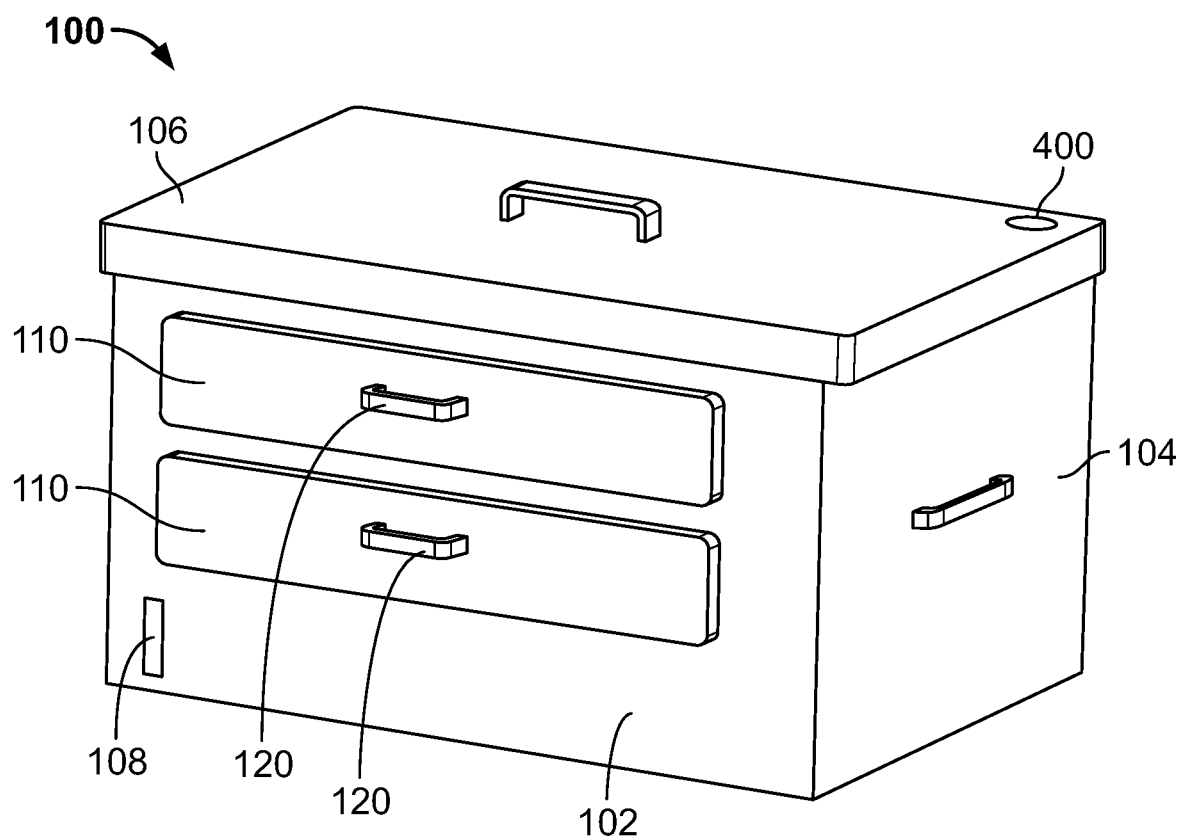
FIG. 4 illustrates a second embodiment of the new steamer.

FIG. 4 illustrates a perspective view of the steamer 100. FIG. 4 shows that the lid 106 of the steamer 100 includes an aperture 400. The aperture 400 is located near the far-right corner of the lid 106. During cooking, when the water level in the bottom section is low, as shown in the water-level viewing window 108, fresh water can be added through the aperture 400. The size or shape of the water-level viewing window 108 can be configured differently. The window 108 is shaped like a circle in FIG. 1 and a bar in FIG. 4.

Figure 5:
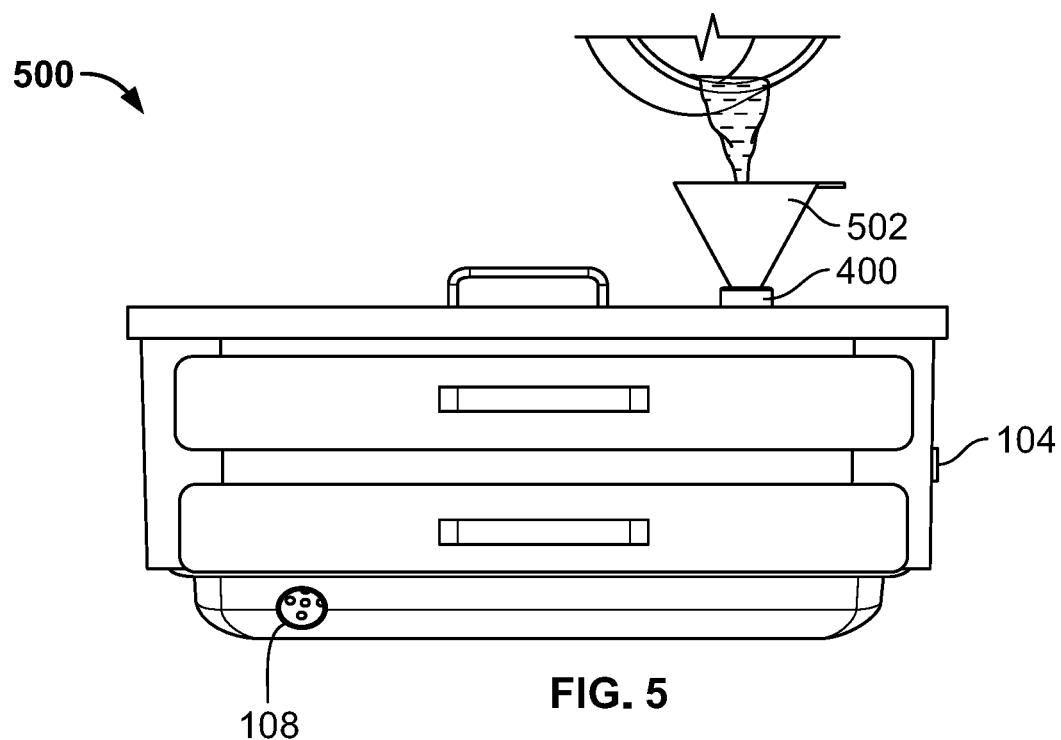
FIG. 5 illustrates a process of adding water into the bottom tray.

FIG. 5 illustrates a water-replenishing process 500 for adding water into the steamer 100. The aperture 400 may include a removable cap. After the optional cap is removed, a funnel is placed into the aperture 400 and water can be added to the steamer 100 via the funnel.

In some embodiments, the containers 210 and 212 do not extend as deep or as wide as the top section 104. That is, the inner wall of the containers 210 and 212 does not reach the side walls of the top section 104. There is a gap between the containers 210 and 210 and the side walls of the top section 104. Water entering through the aperture 400 can fall through the gap into the bottom section 102 of the steamer 100.

In some embodiments, the aperture 400 may be located near the left edge or right edge of the top section 104. There may be a gap between the side walls of the containers and those of the top section 104. Water entering the aperture 400 can fall through the gap into the bottom section 102, allowing the water level in the bottom section 102 to be restored during cooking.

Figure 6:
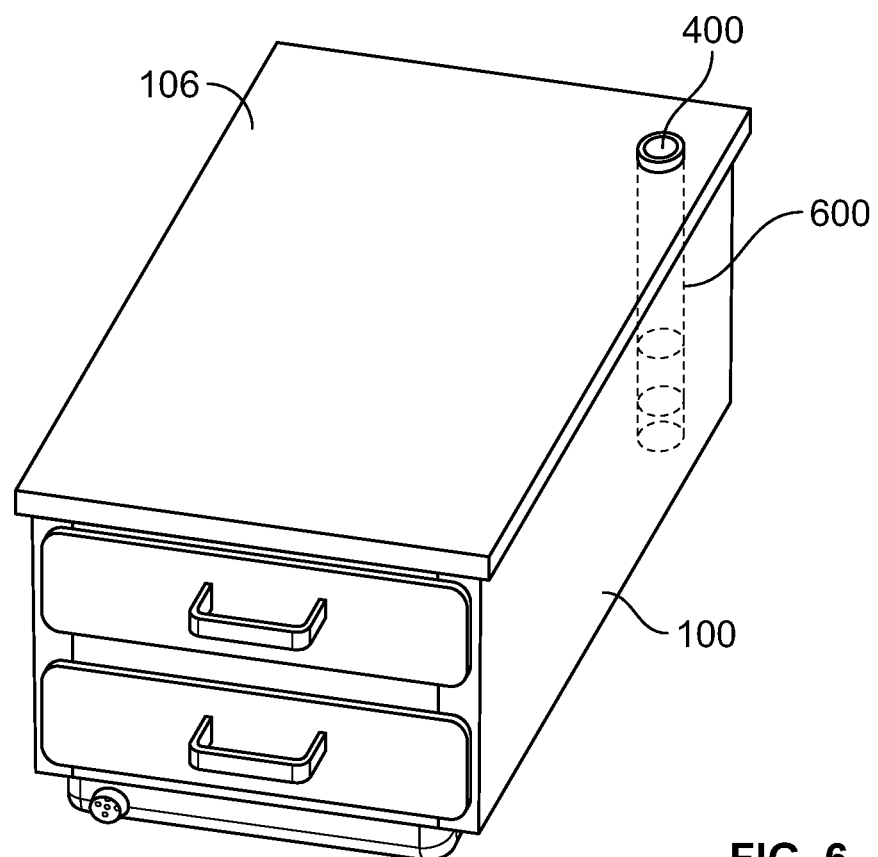
FIG. 6 illustrates an exemplary water chute.

In some embodiments, the aperture 400 is connected to a water chute 600 that extends into the bottom section 102 of the steamer 100, as shown in FIG. 6. The water chute 600 may be attached or affixed to a side wall of the steamer 100. When the lid 106 is placed on top of the top section 104 of the steamer 100, the aperture 400 connects with the water chute 600 to form a connected conduit. Alternatively, the water chute 600 may be attached to the lid 106 or form an integral part with the aperture 400.

Figure 7:
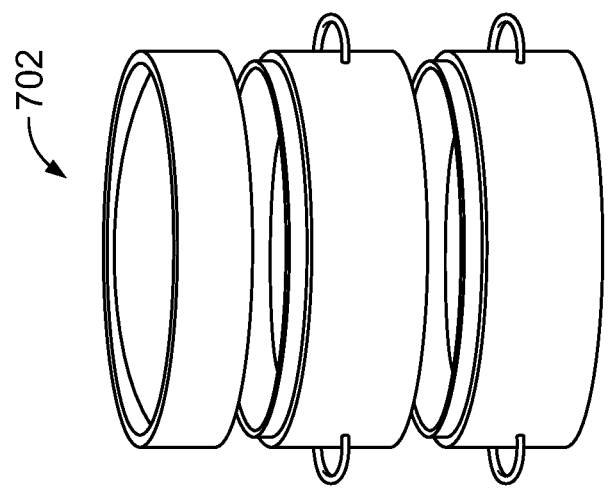
FIG. 7 illustrates an exemplary lid to be used with a steamer.
Figure 7:
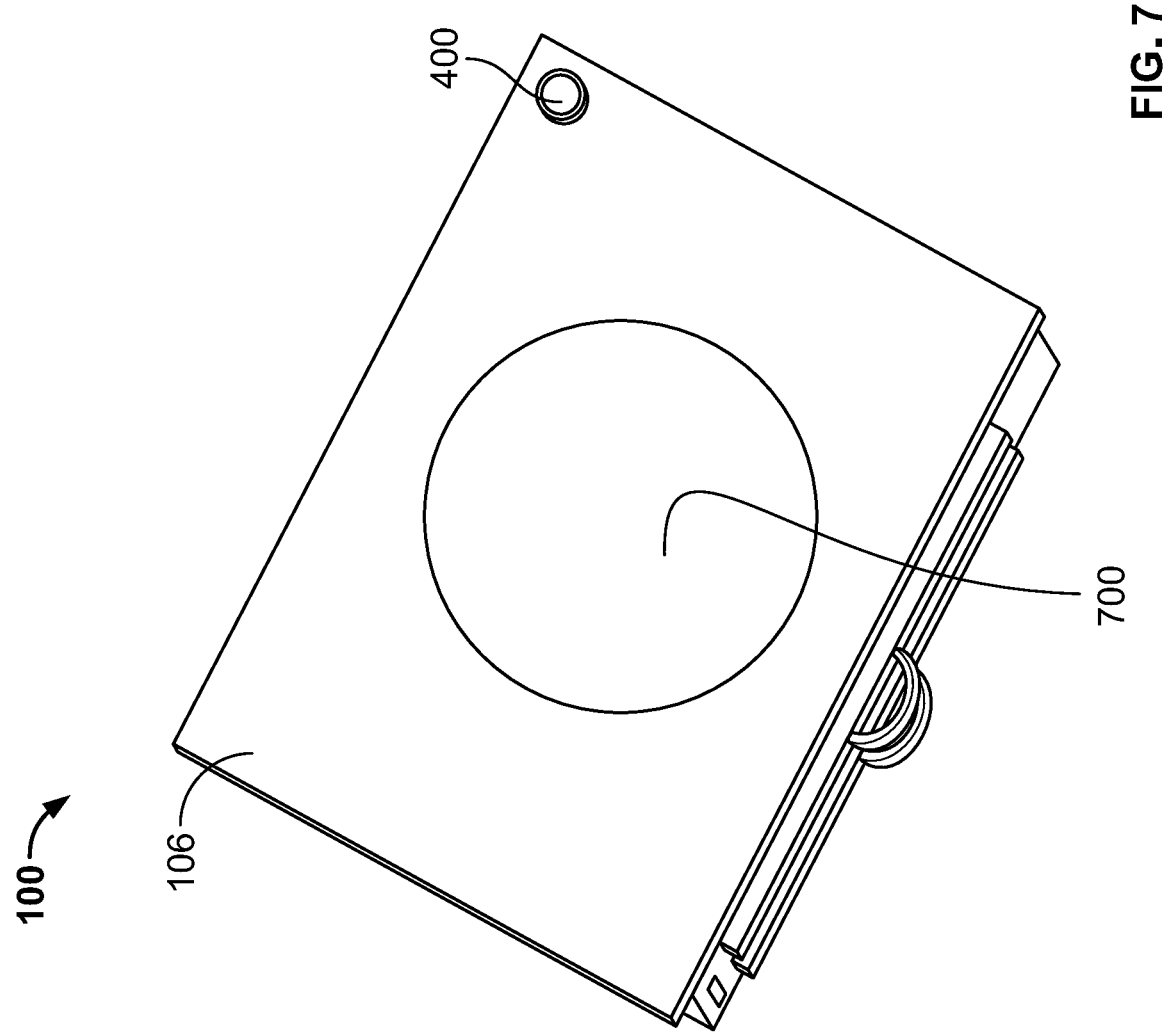

The aperture 400 on the lid 106 provides a convenient way to add water to the steamer 100 without the need of removing all food trays used in a traditional steamer. However, the lid 106 can be made compatible with traditional steamer baskets. Traditional steamer baskets, such as bamboo steamers 702 shown in FIG. 7, are convenient tools for cooking Chinese food. Bamboo steamers are often round shaped. The lid 106 may be configured to include a removable center portion 700 in order to accommodate bamboo steamer baskets 702.

The center portion 700 of the lid 106 in FIG. 7 is round and removable. When the center portion 700 is removed, bamboo steamers can be placed in the center of the lid 106, similarly to the traditional Chinese cooking process in which bamboo steamers are placed on a conventional wok.

The lid 106 can be configured to accommodate other types or shapes of steamer baskets. The lid 106 is exchangeable. When a recipe calls for a different steamer, a different lid can be used.

Figure 8:
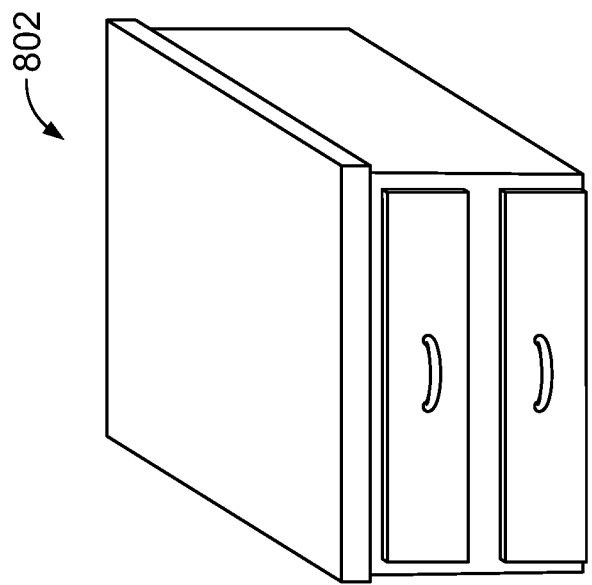
FIG. 8 illustrates another exemplary lid to be used with a steamer.
Figure 8:
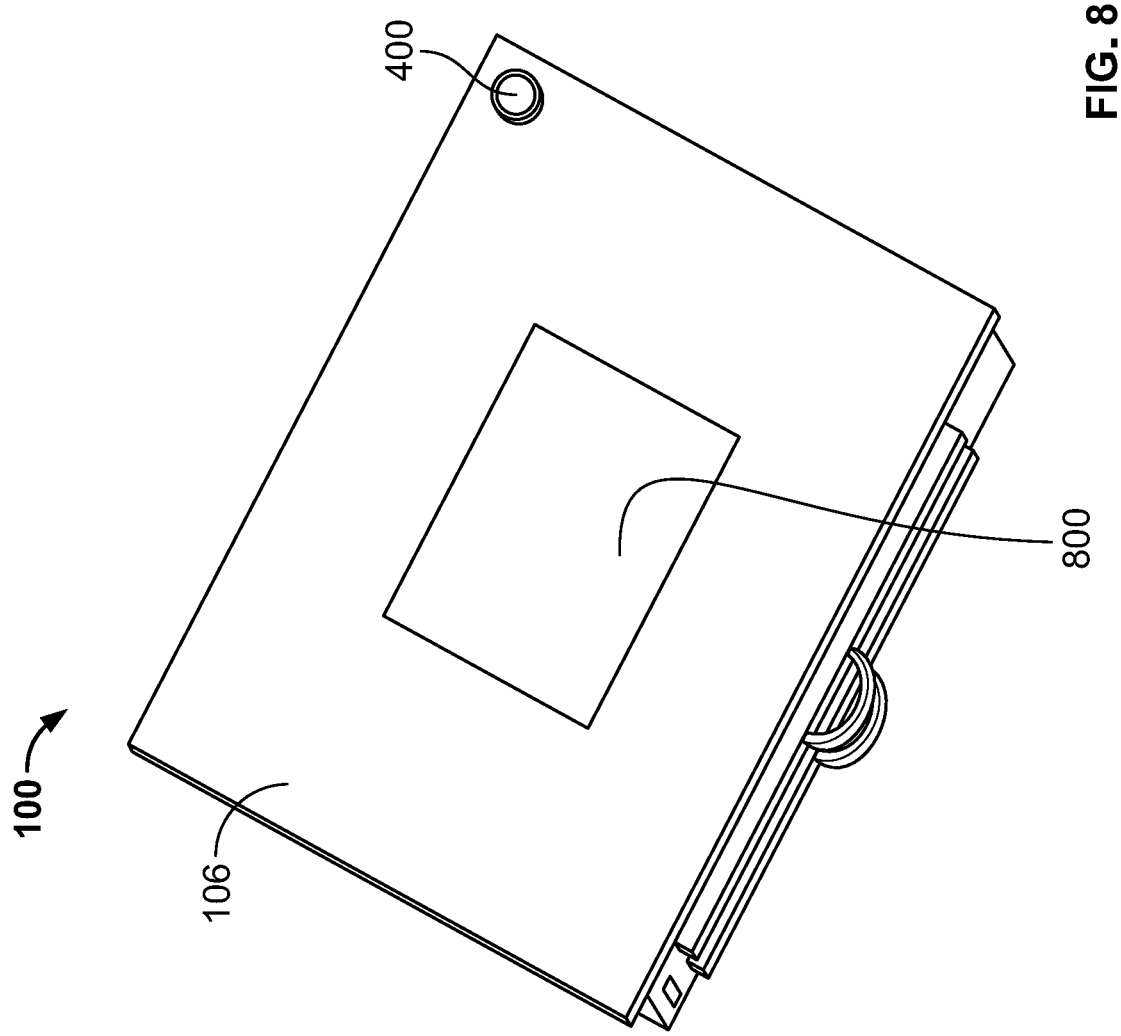

For example, FIG. 8 illustrates the steamer 100 having a different lid 106. The removable portion 800 of the lid 106 is rectangular, in order to accommodate the steamer baskets 802. Indeed, lids designed for special steamer baskets can be packaged and sold together with the steamer baskets. Customers can continue use the same steamer 100 to cook food using new and different steamer baskets.

Although the disclosure is illustrated and described herein with reference to specific embodiments, the disclosure is not intended to be limited to the details shown. Rather, various modifications may be made in the details within the scope and range of equivalents of the claims and without departing from the disclosure.

What is claimed is:

1. A rectangular-shaped steamer, comprising:
a first lid with a removable center that is rectangular or circular, wherein the first lid is configured to accommodate one or more steamer baskets of a same shape as the removable center when the removable center is removed;
a bottom section for holding water, wherein the bottom section comprises a heating element; and
a top section comprising one or more containers that situate above the bottom section and are designed to slide in and out of the top section of the steamer when pulled by one or more handles.

2. The steamer of claim 1, wherein the heating element is an electric heating element.

3. The steamer of claim 1, wherein the heating element is a gas heating element.

4. The steamer of claim 1, wherein the lid comprises an aperture configured to conduct water to the bottom section.

5. The steamer of claim 1, wherein the bottom section comprises a window for viewing the water level in the bottom section.

6. The steamer of claim 1, wherein the steamer further comprises a second lid with a removable center of a different shape than the removable center in the first lid, and wherein the first lid and the second lid are used to accommodate differently shaped steamer baskets.

7. A steamer, comprising:
- a first lid with a first removable center, wherein the first lid is configured to accommodate one or more steamer baskets of a same shape as the first removable center when the first removable center is removed;
- a second lid with a second removable center, wherein the second removable center is of a different shape than the first removable center, and wherein the second lid is configured to accommodate one or more steamer baskets of a same shape as the second removable center when the second removable center is removed; and
- a top section and a bottom section, wherein the top section comprises one or more containers that situate above the bottom section and are designed to slide in and out of the top section of the steamer when pulled by one or more handles.

8. The steamer of claim 7, wherein the steamer is configured to be placed on a heating element during a cooking process or the steamer is configured with a heating element for cooking.

* * * * *